United States Patent
Kondo et al.

(10) Patent No.: US 7,379,878 B2
(45) Date of Patent: May 27, 2008

(54) INFORMATION ENCODING APPARATUS AND METHOD, INFORMATION DECODING APPARATUS AND METHOD, RECORDING MEDIUM UTILIZING SPECTRAL SWITCHING FOR EMBEDDING ADDITIONAL INFORMATION IN AN AUDIO SIGNAL

(75) Inventors: Tetsujiro Kondo, Tokyo (JP); Gakuho Fukushi, Chiba (JP); Masaaki Hattori, Chiba (JP); Kazutaka Ando, Kanagawa (JP); Hiroto Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 855 days.

(21) Appl. No.: 10/617,347

(22) Filed: Jul. 10, 2003

(65) Prior Publication Data
US 2004/0081243 A1 Apr. 29, 2004

(30) Foreign Application Priority Data
Jul. 12, 2002 (JP) .............................. 2002-203878

(51) Int. Cl.
*G10L 19/00* (2006.01)
*H04K 1/04* (2006.01)
(52) U.S. Cl. .................... 704/501; 704/500; 380/38
(58) Field of Classification Search ................ 704/200, 704/200.1, 201, 500, 501; 380/255, 38
See application file for complete search history.

(56) References Cited

U.S. PATENT DOCUMENTS

| | | | | | |
|---|---|---|---|---|---|
| 5,581,653 | A | * | 12/1996 | Todd | 704/229 |
| 5,822,432 | A | * | 10/1998 | Moskowitz et al. | 380/28 |
| 5,960,398 | A | * | 9/1999 | Fuchigami et al. | 704/270 |
| 6,272,176 | B1 | * | 8/2001 | Srinivasan | 375/240 |
| 6,850,619 | B1 | * | 2/2005 | Hirai | 380/203 |
| 7,006,555 | B1 | * | 2/2006 | Srinivasan | 375/133 |

OTHER PUBLICATIONS

Patent Abstracts of Japan, Publication No. 10-162501, Publication date Jun. 19, 1998.

* cited by examiner

Primary Examiner—Patrick N. Edouard
Assistant Examiner—James S. Wozniak
(74) Attorney, Agent, or Firm—Frommer Lawrence & Haug LLP; William S. Frommer; Thomas F. Presson

(57) ABSTRACT

An information encoding apparatus and method, an information decoding apparatus and method, a recording medium, and a program make it possible to embed information without causing an increase in the amount of data of compressed audio signals. A spectrum measurer converts an audio signal from a time axis signal into a frequency axis signal. A compressor removes frequency spectra having levels below a minimum audible threshold value. An embedability determiner determines whether information can be embedded. A spectrum switcher embeds information in an audio signal by switching or by not switching predetermined first frequency spectrum and second frequency spectrum under the control of an information adder. The present invention is applicable to a disk recording apparatus.

8 Claims, 13 Drawing Sheets

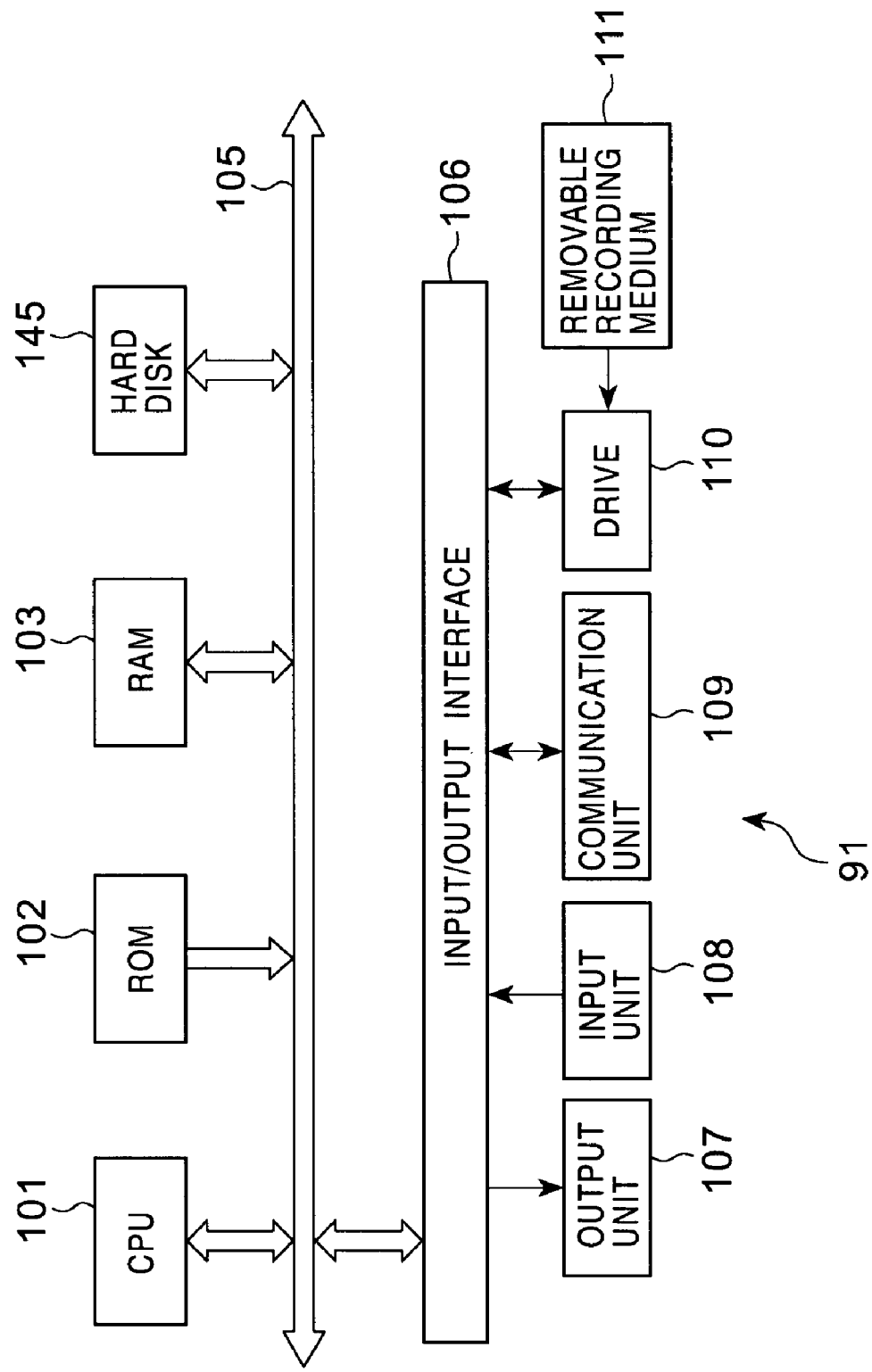

INFORMATION ENCODING APPARATUS AND METHOD, INFORMATION DECODING APPARATUS AND METHOD, RECORDING MEDIUM UTILIZING SPECTRAL SWITCHING FOR EMBEDDING ADDITIONAL INFORMATION IN AN AUDIO SIGNAL

BACKGROUND OF THE INVENTION

1. Field of the Invention

The present invention relates to an information encoding apparatus and method, an information decoding apparatus and method, a recording medium, and a program and more particularly, to an information encoding apparatus and method, an information decoding apparatus and method, a recording medium, and a program that allow data to be embedded in audio signals.

2. Description of the Related Art

Hitherto, as a method for compressing audio signals, there has been known a method in which frequency components not reaching a minimum audible level curve are removed. The minimum audible level curve is collective experimental values of the human-audible levels of pulse sounds having various different frequencies in a quiet environment. The curve is denoted as L in FIG. 1.

Referring to FIG. 1, the axis of abscissa indicates the frequencies of the spectra of audio signals, while the axis of ordinate indicates the levels of the spectra of audio signals. The level of spectrum A is greater than the value in the minimum audible level curve at that frequency, meaning that the level of spectrum A is above the minimum level audible to human ears, so that people can hear it. The level of spectrum B is below the value in the minimum audible level curve at that frequency, meaning that the level of spectrum B is below the minimum level audible to human ears, so that people cannot hear it.

Conventionally, compression of audio signals has been accomplished by removing the spectra whose levels are below the values in the minimum audible level curve at particular frequencies (inaudible), as indicated by spectrum B in FIG. 1. This compression method is used also in the moving picture experts group (MPEG) and other types of audio encoding methods.

Conventional compression methods, however, have been disadvantageous in that they cannot allow information to be embedded while compressing audio signals at the same time. For example, it is possible to directly embed information in a spectrum having a level below a value in the minimum audible level curve at the frequency. The embedded information, however, will add to the amount of information, because the spectrum having the embedded information cannot be cut off.

SUMMARY OF THE INVENTION

The present invention has been made with a view toward solving the technological problems described above, and it is an object of the present invention to allow audio signals to be compressed and information to be embedded at the same time.

An information encoding apparatus in accordance with the present invention includes a converting device for converting an input signal into a spectrum signal, a removing device for removing the spectra of frequencies having levels below a minimum audible level curve among spectra converted by the converting device, a first determining device for determining whether predetermined first frequency spectrum level and second frequency spectrum level are both above the minimum audible level curve, a second determining device for determining whether one of the first frequency spectrum level and the second frequency spectrum level is below the minimum level if the first and second frequency spectrum levels are switched after the first determining device determines that the first frequency spectrum level and the second frequency spectrum level are both above the minimum audible level curve, an adding device for adding information by controlling to switch or not to switch the spectra on the basis of the information to be added if the second determining device determines that one of the first frequency spectrum level and the second frequency spectrum level is below the minimum audible level curve, when the first and second frequency spectrum levels have been switched, and an encoding device for encoding a spectrum to which information has been added by the adding device.

An information encoding method in accordance with the present invention includes a converting step for converting an input signal into a spectrum signal, a removing step for removing the spectra of frequencies having levels below a minimum audible level curve among spectra converted by processing in the converting step, a first determining step for determining whether predetermined first frequency spectrum level and second frequency spectrum level are both above the minimum audible level curve, a second determining step for determining whether one of the first frequency spectrum level and the second frequency spectrum level is below the minimum level if the first and second frequency spectrum levels have been switched after the processing of the first determining step determines that the first frequency spectrum level and the second frequency spectrum level are both above the minimum audible level curve, an adding step for adding information by controlling to switch or not to switch the spectra on the basis of the information to be added if the processing of the second determining step determines that one of the first frequency spectrum level and the second frequency spectrum level is below the minimum audible level curve when the first and second frequency spectrum levels have been switched, and an encoding step for encoding a spectrum to which information has been added by the processing of the adding step.

A program recorded in a recording medium in accordance with the present invention includes a converting step for converting an input signal into a spectrum signal, a removing step for removing the spectra of frequencies having levels below a minimum audible level curve among spectra converted by the processing in the converting step, a first determining step for determining whether predetermined first frequency spectrum level and second frequency spectrum level are both above the minimum audible level curve, a second determining step for determining whether one of the first frequency spectrum level and the second frequency spectrum level is below the minimum level if the first and second frequency spectrum levels have been switched after the processing of the first determining step determines that the first frequency spectrum level and the second frequency spectrum level are both above the minimum audible level curve, an adding step for adding information by controlling to switch or not to switch the spectra on the basis of the information to be added if the processing of the second determining step determines that one of the first frequency spectrum level and the second frequency spectrum level is below the minimum audible level curve when the first and second frequency spectrum levels have been switched, and an encoding step for encoding a spectrum to which information has been added by the processing of the adding step.

A program in accordance with the present invention includes a converting step for converting an input signal into a spectrum signal, a removing step for removing the spectra of frequencies having levels below a minimum audible level curve among spectra converted by processing of the converting step, a first determining step for determining whether predetermined first frequency spectrum level and second frequency spectrum level are both above the minimum audible level curve, a second determining step for determining whether one of the first frequency spectrum level and the second frequency spectrum level is below the minimum level if the first and second frequency spectrum levels have been switched after the processing of the first determining step determines that the first frequency spectrum level and the second frequency spectrum level are both above the minimum audible level curve, an adding step for adding information by controlling to switch or not to switch the spectra on the basis of the information to be added if the processing of the second determining step determines that one of the first frequency spectrum level and the second frequency spectrum level is below the minimum audible level curve when the first and second frequency spectrum levels have been switched, and an encoding step for encoding a spectrum to which information has been added by the processing of the adding step.

An information decoding apparatus in accordance with the present invention includes a decoding device for decoding an input signal, a first determining device for determining whether only one of a first frequency spectrum level and a second frequency spectrum level of a signal decoded by the decoding device is below a minimum audible level curve, a second determining device for determining whether only one of the first frequency spectrum level and the second frequency spectrum level is below the minimum level when the first and second frequency spectrum levels are switched, and a reproducing device for reproducing added information on the basis of determination results of the first determining device and the second determining device.

An information decoding method in accordance with the present invention includes a decoding step for decoding an input signal, a first determining step for determining whether only one of a first frequency spectrum level and a second frequency spectrum level of a signal decoded by processing of the decoding step is below a minimum audible level curve, a second determining step for determining whether only one of the first frequency spectrum level and the second frequency spectrum level is below the minimum level when the first and second frequency spectrum levels are switched, and a reproducing step for reproducing added information on the basis of determination results obtained by the processing of the first determining step and the second determining step.

A program recorded in a recording medium in accordance with the present invention includes a decoding step for decoding an input signal, a first determining step for determining whether only one of a first frequency spectrum level and a second frequency spectrum level of a signal decoded by the processing of the decoding step is below a minimum audible level curve, a second determining step for determining whether only one of the first frequency spectrum level and the second frequency spectrum level is below the minimum level when the first and second frequency spectrum levels are switched, and a reproducing step for reproducing added information on the basis of determination results obtained by the processing of the first determining step and the second determining step.

A program in accordance with the present invention includes a decoding step for decoding an input signal, a first determining step for determining whether only one of a first frequency spectrum level and a second frequency spectrum level of a signal decoded by processing of the decoding step is below a minimum audible level curve, a second determining step for determining whether only one of the first frequency spectrum level and the second frequency spectrum level is below the minimum level when the first and second frequency spectrum levels are switched, and a reproducing step for reproducing added information on the basis of determination results obtained by processing of the first determining step and the second determining step.

In the information encoding apparatus and method, a recording medium and a program according to the present invention, when predetermined first frequency spectrum level and second frequency spectrum level are both above a minimum audible level curve, and the first frequency spectrum and the second frequency spectrum are switched, if one of the switched spectrum levels is below the minimum audible level curve, then information is added by switching or not by switching the first frequency spectrum and the second frequency spectrum.

In the information decoding apparatus and method, the recording medium, and the program according to the present invention, information is reproduced on the basis of a result of the determination of whether a first frequency spectrum level and a second frequency spectrum level are both above a minimum audible level curve and a result of the determination of whether, when the first frequency spectrum and the second frequency spectrum are switched, one of the switched spectrum levels is below the minimum audible level curve.

BRIEF DESCRIPTION OF THE DRAWINGS

FIG. 13 is a block diagram showing a configuration example of an embodiment of a computer to which the present invention has been applied.

DESCRIPTION OF THE PREFERRED EMBODIMENTS

An embodiment in accordance with the present invention will now be explained with reference to the accompanying drawings.

Figure 2:
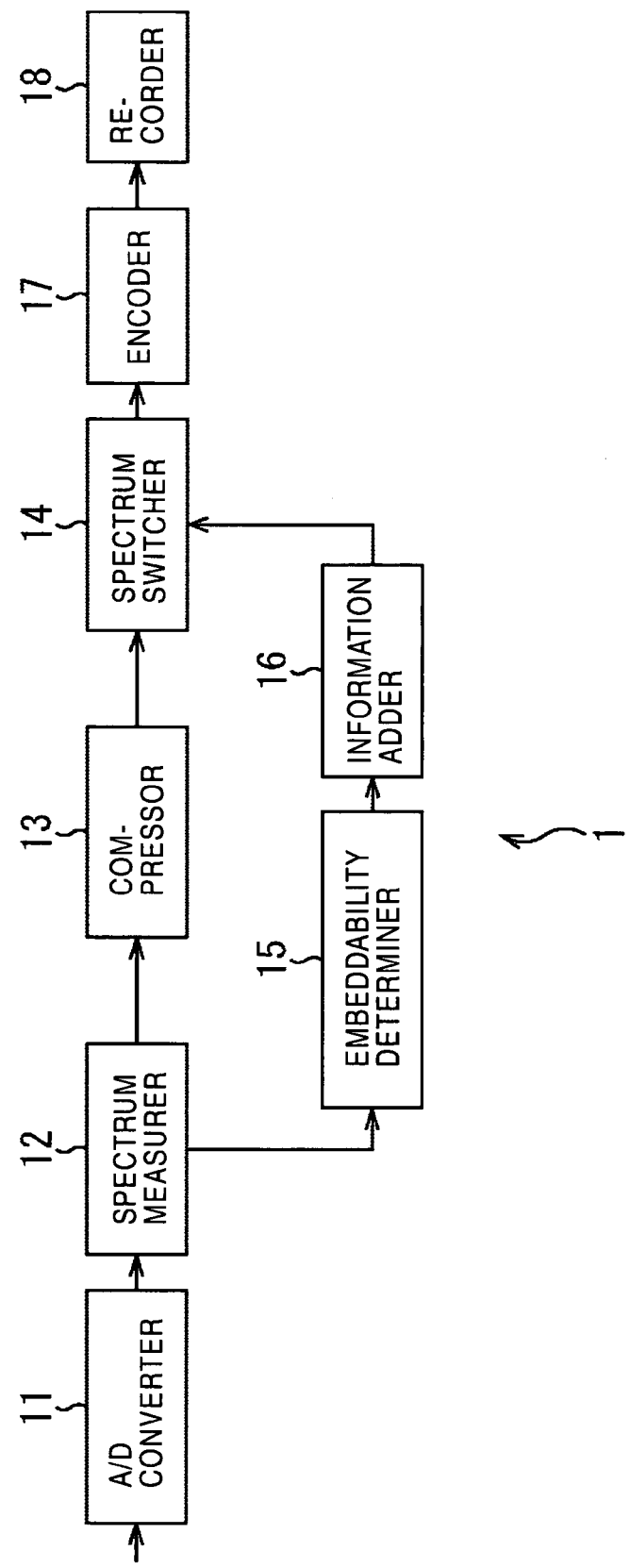
FIG. 2 is a block diagram showing a configuration example of an information processor to which the present invention has been applied.

FIG. 2 shows an information processor to which the present invention has been applied and which is adapted to embed information in an audio signal. In an information processor 1 serving as an information encoding apparatus, an input audio signal is converted from an analog signal into a digital signal by an A/D converter 11. The audio signal converted into the digital signal is supplied to a spectrum measurer 12 so as to be further converted into a spectrum signal by, for example, Fourier transformation, for every predetermined unit time, and the spectrum level thereof is measured.

The audio signal whose spectrum level has been measured is supplied to a compressor 13 where it is compressed. In the compressing process, frequency spectrum B, the level of which is below a minimum audible level curve L (FIG. 1) and therefore cannot be audibly recognized by human beings, is cut off. The compressed audio signal or spectrum signal is supplied to a spectrum switcher 14 for switching spectra.

The spectrum signal generated by the spectrum measurer 12 is also supplied to an embedability determiner 15 wherein it is determined whether information can be embedded by switching spectra. This will be explained in more detail later in the description of the processing of step S14 shown in FIG. 4.

The result of the determination provided by the embedability determiner 15 regarding whether the information can be embedded is sent to an information adder 16. If the embedability determiner 15 decides that the information can be embedded, then the information adder 16 supplies a control signal for controlling the switching of spectra to the spectrum switcher 14 on the basis of the information to be embedded or added.

Based on the control signal from the information adder 16, the spectrum switcher 14 switches spectrum signals supplied from the compressor 13.

An encoder 17 encodes spectrum signals supplied from the spectrum switcher 14. The encoder 17 encodes audio data (the spectrum signals in this case) by, for example, the adaptive dynamic range coding (ADRC).

Figure 3:
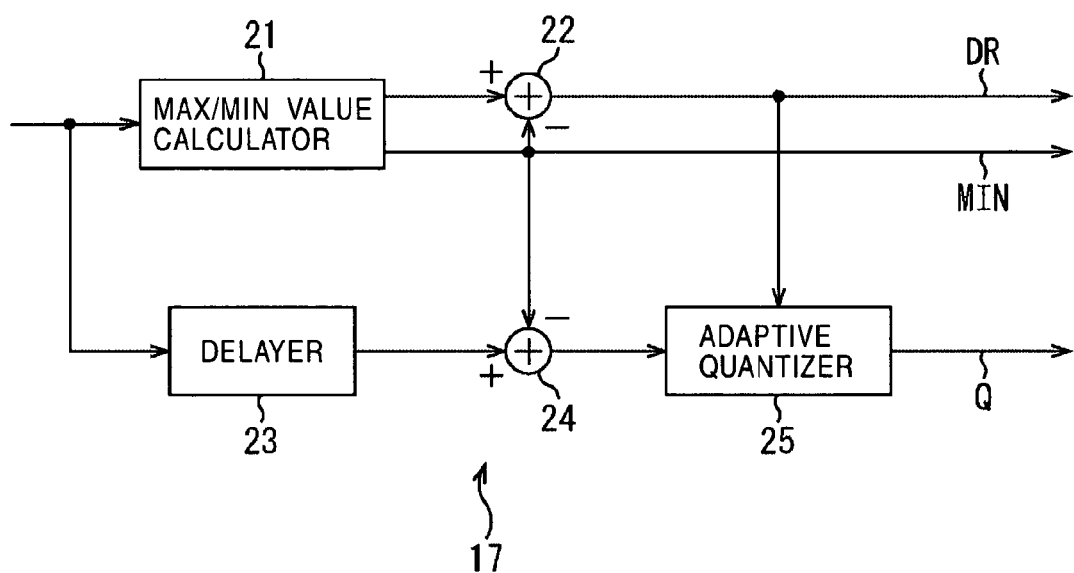
FIG. 3 is a block diagram showing a configuration example of an encoder shown in FIG. 2.

FIG. 3 shows a configuration example of an encoder 17.

Audio data is input to a max/min value calculator 21. The max/min value calculator 21 calculates a maximum value and minimum value of the audio data for each unit, and outputs the calculated minimum value MIN. The maximum and minimum values are subtracted by a subtracter 22 to obtain a dynamic range DR, which is output.

Furthermore, the difference between each level value and the minimum level value is calculated by a subtracter 24, the calculation results being sent to an adaptive quantizer 25. A delayer 23 holds off the timing at which each level value is sent to the subtracter 24 by the time required for the minimum level value to be sent to the subtracter 24. If the number of quantization bits is n, then the adaptive quantizer 25 divides the dynamic range DR by 2n to determine the quantization step width, divides the subtraction result received from the subtracter 24 by the quantization step width, and rounds off the division result to an integer so as to generate a quantization code Q. Thus, the encoder 7 outputs the dynamic range DR, the minimum value MIN and the quantization code Q as compressed and encoded data.

The descriptions have been given of the example wherein the encoder 17 uses the ADRC. Alternatively, however, the data may be processed using other methods, including the discrete cosine transform (DCT) coding, the differential pulse code modulation (DPCM), vector quantization, sub-band coding and wavelet transform.

The data processed by the encoder 17 is supplied to a recorder 18 and recorded in a recording medium, such as a disc (not shown). The data may alternatively be sent out to a transmission line.

Figure 4:
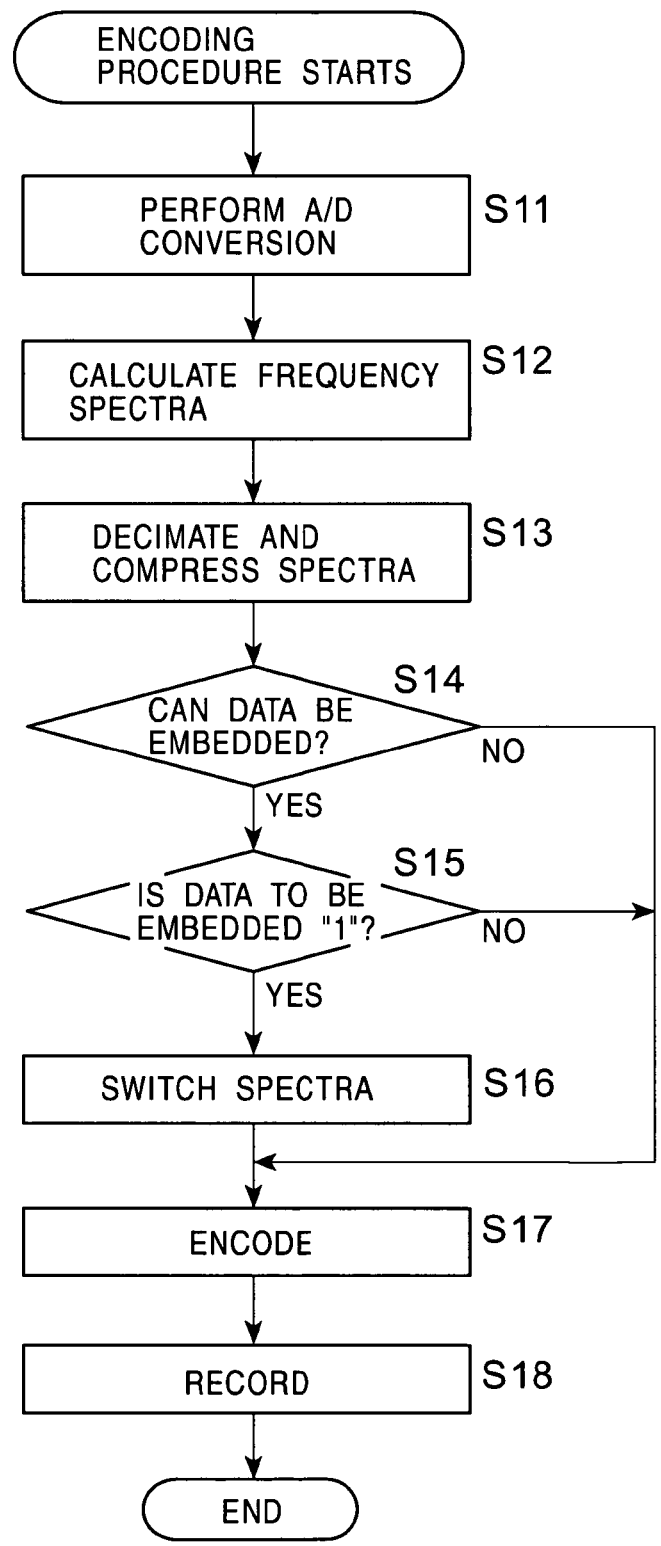
FIG. 4 is a flowchart illustrating the encoding processing carried out by the information processor shown in FIG. 2.

Referring now to the flowchart of FIG. 4, the coding procedure carried by the information processor 1 shown in FIG. 2 will be explained.

In step S11, the A/D converter 11 converts a received audio signal from an analog signal into a digital signal.

In step S12, the spectrum measurer 12 transforms the audio signal on the time axis, which has been converted into the digital signal, into a spectrum signal on the frequency axis by Fourier transformation or the like. This processing is adapted to transform audio time signals into frequency signals at predetermined time intervals.

In step S13, the compressor 13 compresses the audio signal by decimating the frequency spectra. More specifically, as described with reference to FIG. 1, the audio signal is compressed by decimating the frequency spectra indicated by, for example, B in FIG. 1, whose level is below the minimum audible level curve and inaudible to human beings.

In step S14, the embedability determiner 15 determines whether data can be embedded in the audio signal.

In this example, it is determined that the data can be embedded in the audio signal if the following two conditions are met: $Sa>C(fa)$ and $Sb>C(fb)$ $Sa<C(fb)$ or $Sb<C(fa)$ where the levels of two predetermined frequencies fa and fb are denoted as Sa and Sb and the function imparting a minimum audible limit value for each frequency f is denoted as $C(f)$, as shown in FIG. 5.

The first condition mentioned above means that both spectrum levels Sa and Sb of the two predetermined frequencies fa and fb are above the minimum audible limit values corresponding to the frequencies. Hence, meeting the first condition means that the spectra of interest should be transmitted or should not be removed.

Satisfying the second condition means that, when the levels Sa and Sb of the two predetermined frequencies fa and fb are switched, one of the switched levels is smaller than the minimum audible limit value.

Figure 5:
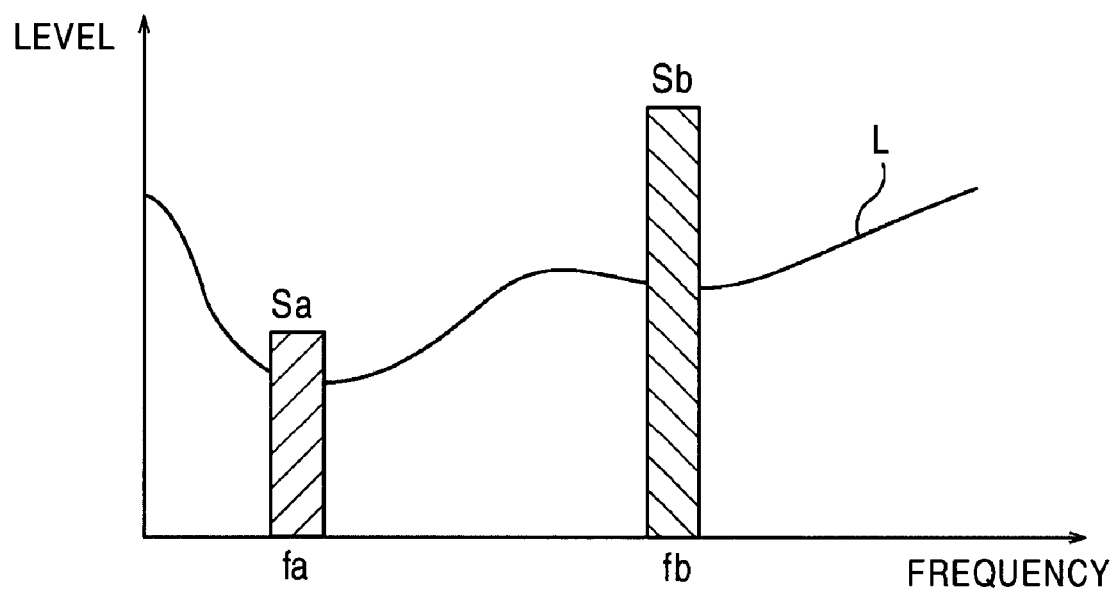
FIG. 5 illustrates a process of embedding data.
Figure 6:
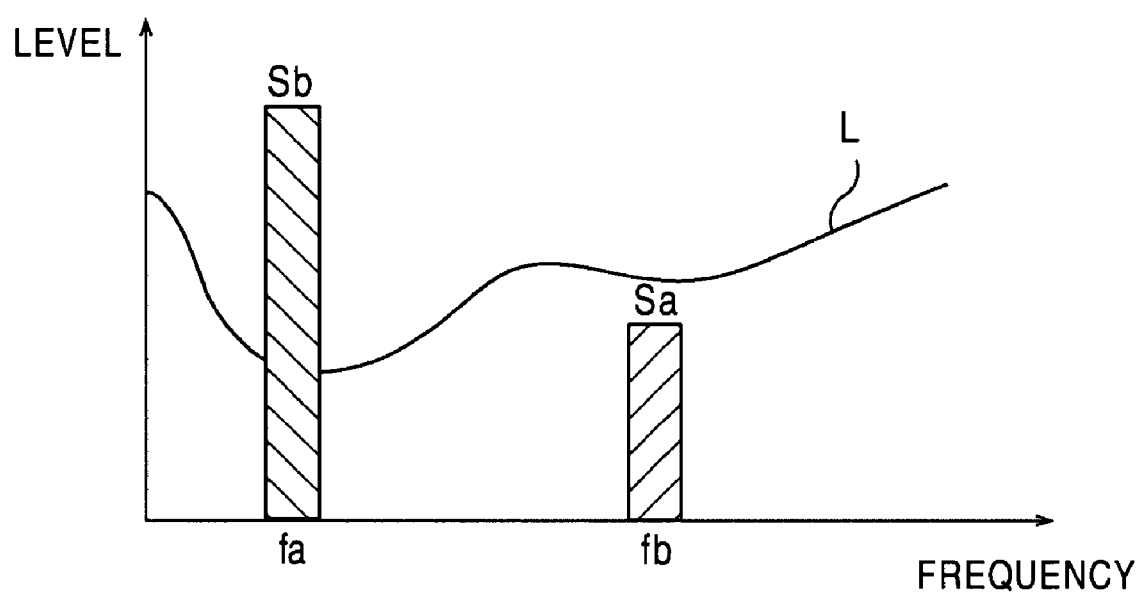
FIG. 6 illustrates another process of embedding data.

For instance, the levels Sa and Sb of the spectra of the two predetermined frequencies fa and fb shown in FIG. 5 are both above the minimum audible level curve L indicating the minimum audible limit values corresponding to the frequencies. When the spectrum positions of the two frequencies fa and fb shown in FIG. 5 are switched, the level Sb of the spectrum positioned at the frequency fa is larger than the minimum audible limit value, i.e., above the minimum audible level curve L, while the level Sa of the spectrum positioned at the frequency fb is smaller than the minimum audible limit value, i.e., below the minimum audible level curve L, as shown in FIG. 6. Therefore, the spectra of the two frequencies fa and fb satisfies the second condition.

It is obvious that the second condition will be satisfied if the level Sa of the spectrum positioned at the frequency fb is larger than the minimum audible limit value and the level Sb of the spectrum positioned at the frequency fa is smaller than the minimum audible limit value when the positions of the levels Sa and Sb of the spectra of the two predetermined frequencies fa and fb have been switched. This relationship is established when the minimum audible limit value is larger at the frequency fa than at the frequency fb.

Figure 7:
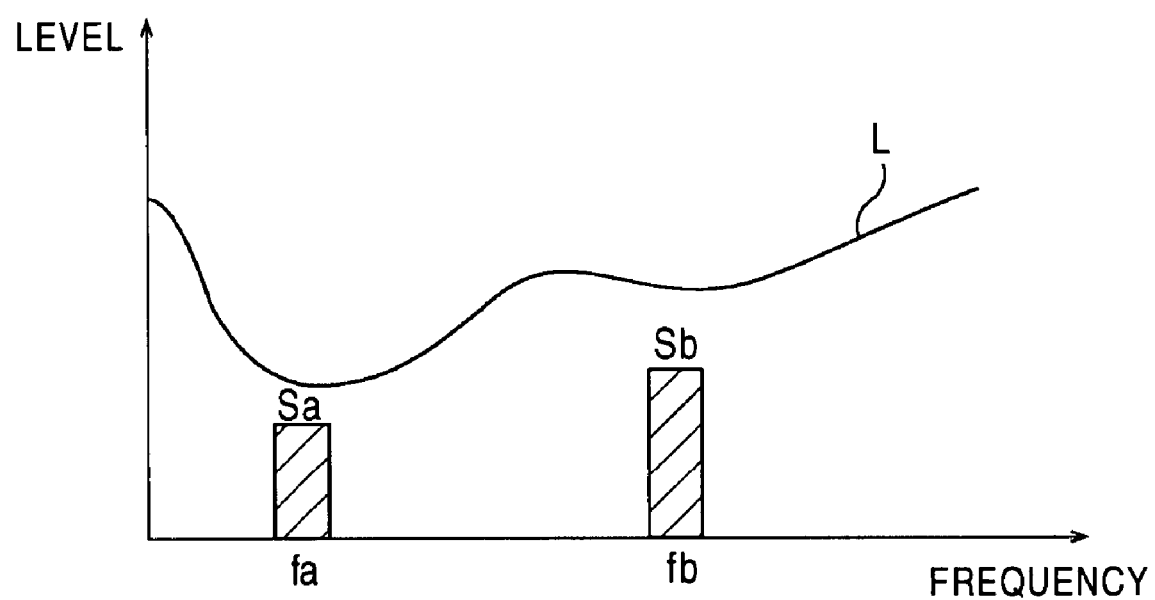
FIG. 7 illustrates yet another process of embedding data.

If, as shown in FIG. 7, the level Sa of the spectrum of the frequency fa and the level Sb of the spectrum of the frequency fb are both smaller than the minimum audible limit value, then the first condition will not be satisfied. It is determined, therefore, that embedding is impossible.

Figure 8:
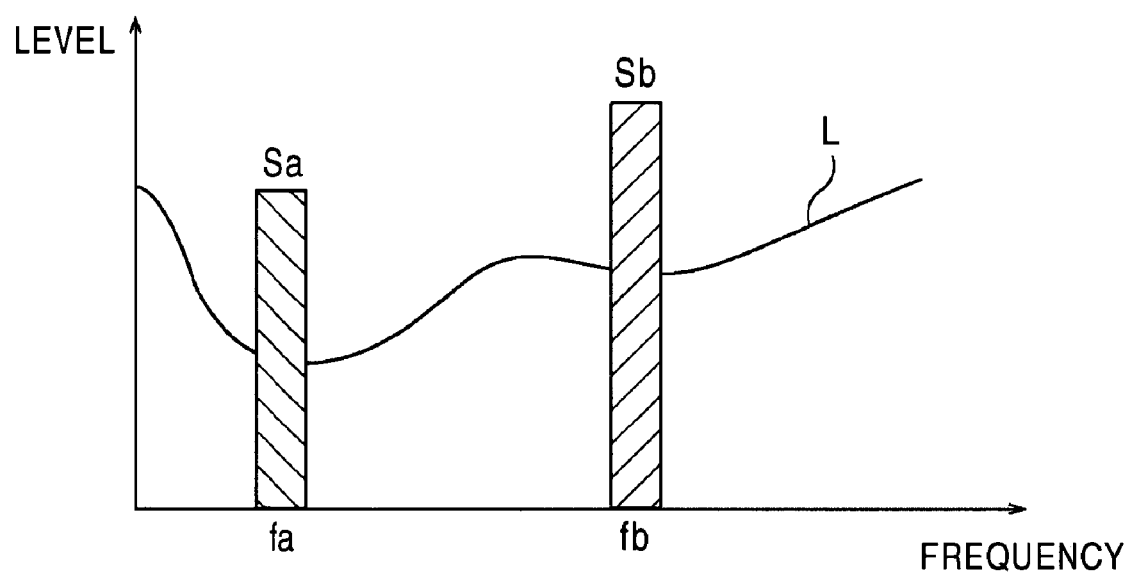
FIG. 8 illustrates still another process of embedding data.
Figure 9:
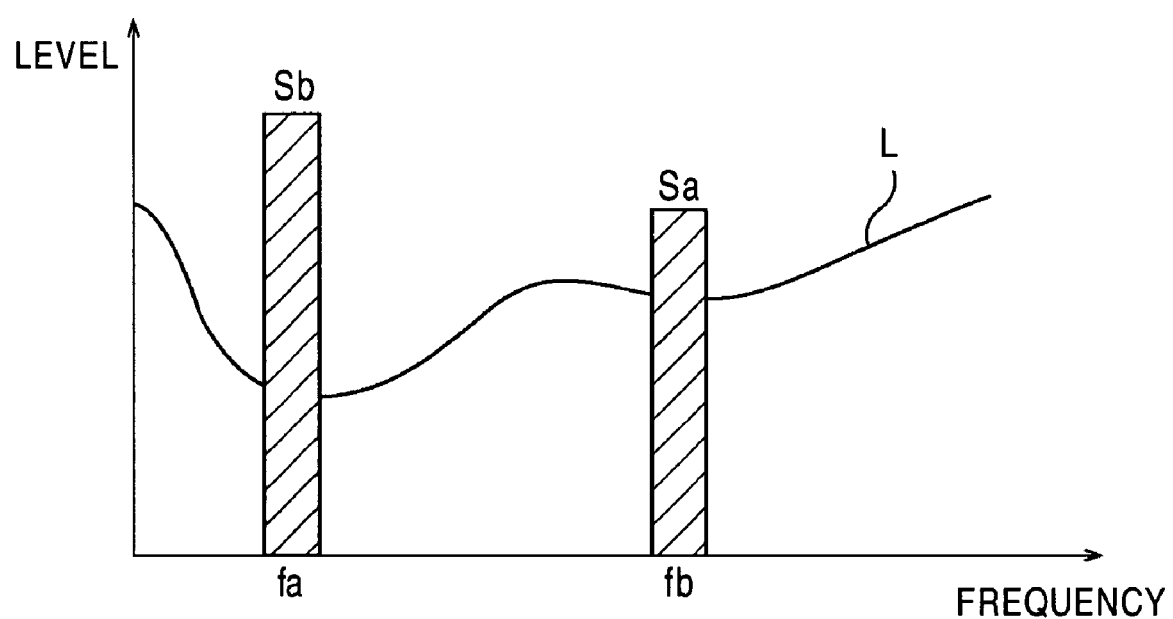
FIG. 9 illustrates a further process of embedding data.

Even if the level Sa of the spectrum of the frequency fa and the level Sb of the spectrum of the frequency fb are both larger than the minimum audible limit value, satisfying the first condition, as shown in FIG. 8, it will be determined that embedding is impossible if both levels are larger than the minimum audible limit value, failing to satisfy the second condition, as shown in FIG. 9, when the positions of the levels are switched.

If it is determined in step S14 that data can be embedded in the audio signal, then the information adder 16 determines in step S15 whether the data to be embedded is 1.

The information adder 16 issues a control signal for switching the spectra if the logic of the data to be embedded in the audio data is 1, while it issues a control signal for not switching the spectra if the logic is 0, i.e., it does not issue the control signal for switching the spectra.

As shown in FIG. 6, the spectrum switcher 14 switches, in step S16, the spectrum levels Sa and Sb of the two predetermined frequencies fa and fb of the spectrum signal supplied from the compressor 13 if the logic of the data to be embedded is 1, i.e., if the control signal for switching spectra from the information adder 16 is received. In other words, the spectrum switcher 14 sets the spectrum level Sa at the frequency fa as the spectrum level of the frequency fb, while it sets the spectrum level Sb of the frequency fb as the spectrum level of the frequency fa.

If the logic of the data to be embedded is 0, i.e., if the control signal for switching the spectra is not received from the information adder 16, then the spectrum switcher 14 does not carry out the processing for switching the spectra, and maintains the original state illustrated in FIG. 5, skipping the processing of step S16. The same procedure applies if it is determined in step S14 that the data cannot be embedded.

Subsequently, in step S17, the encoder 17 encodes the spectrum signal supplied from the spectrum switcher 14.

More specifically, the min/max value calculator 21 calculates the maximum and minimum values of a spectrum signal received for every unit. The subtracter 22 subtracts the minimum value from the maximum value to calculate the dynamic range DR. The subtracter 24 subtracts a minimum value from the level of each spectrum signal whose timing has been adjusted by the delayer 23, and outputs the result to the adaptive quantizer 25.

The adaptive quantizer 25 divides the dynamic range DR by 2 n to calculate the quantization step width, divides the signal supplied from the subtracter 24 by the quantization step width, and rounds off the divided value to an integer to compute the quantization code Q.

In step S18, the recorder 18 modulates the quantization code Q, the minimum value MIN and the dynamic range DR supplied from the encoder 17 as record signals, and records them in a disc.

Figure 1:
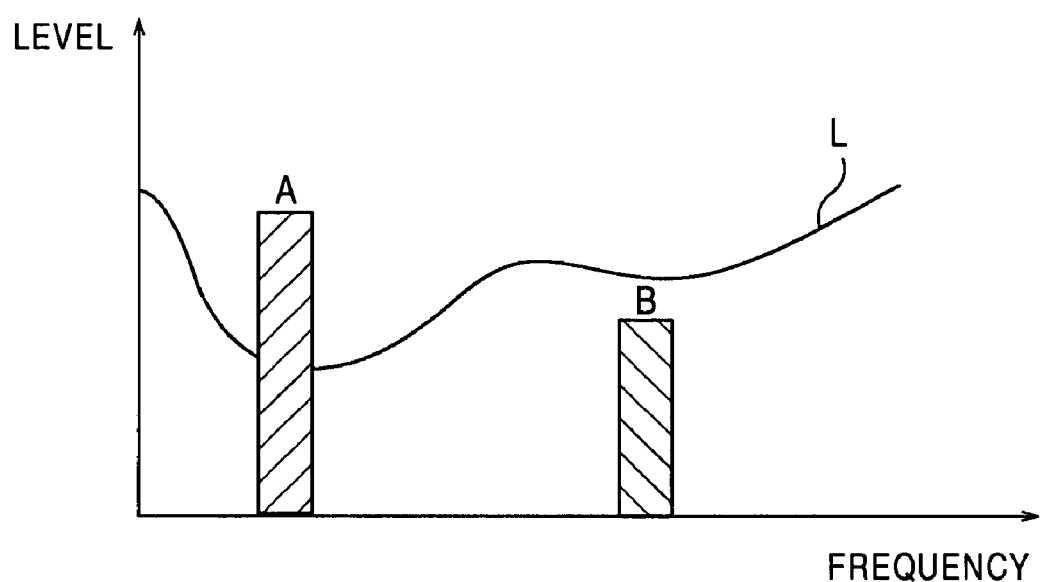
FIG. 1 illustrates a relationship between a minimum audible level curve and two frequency spectrum levels.

Thus, if an audio signal satisfies the data embedding conditions, 1-bit data can be embedded as 0 if the levels Sa and Sb of the two predetermined frequencies fa and fb are not switched, as illustrated in FIG. 5, or 1 if the levels Sa and Sb of the two predetermined frequencies fa and fb are switched, as illustrated in FIG. 6.

Regarding the frequency spectra within a unit time, the amount of data can be increased to 2 bits the number of the combinations of the two predetermined frequencies is set to 2 or 3 bits if the number is set to 3. Furthermore, more data can be added by embedding data for a plurality of units.

For instance, by using 8 bits for expressing one character, copyright information, ID numbers, lyrics, artists' names and music categories can be added to audio signals and recorded in discs or transmitted.

Figure 10:
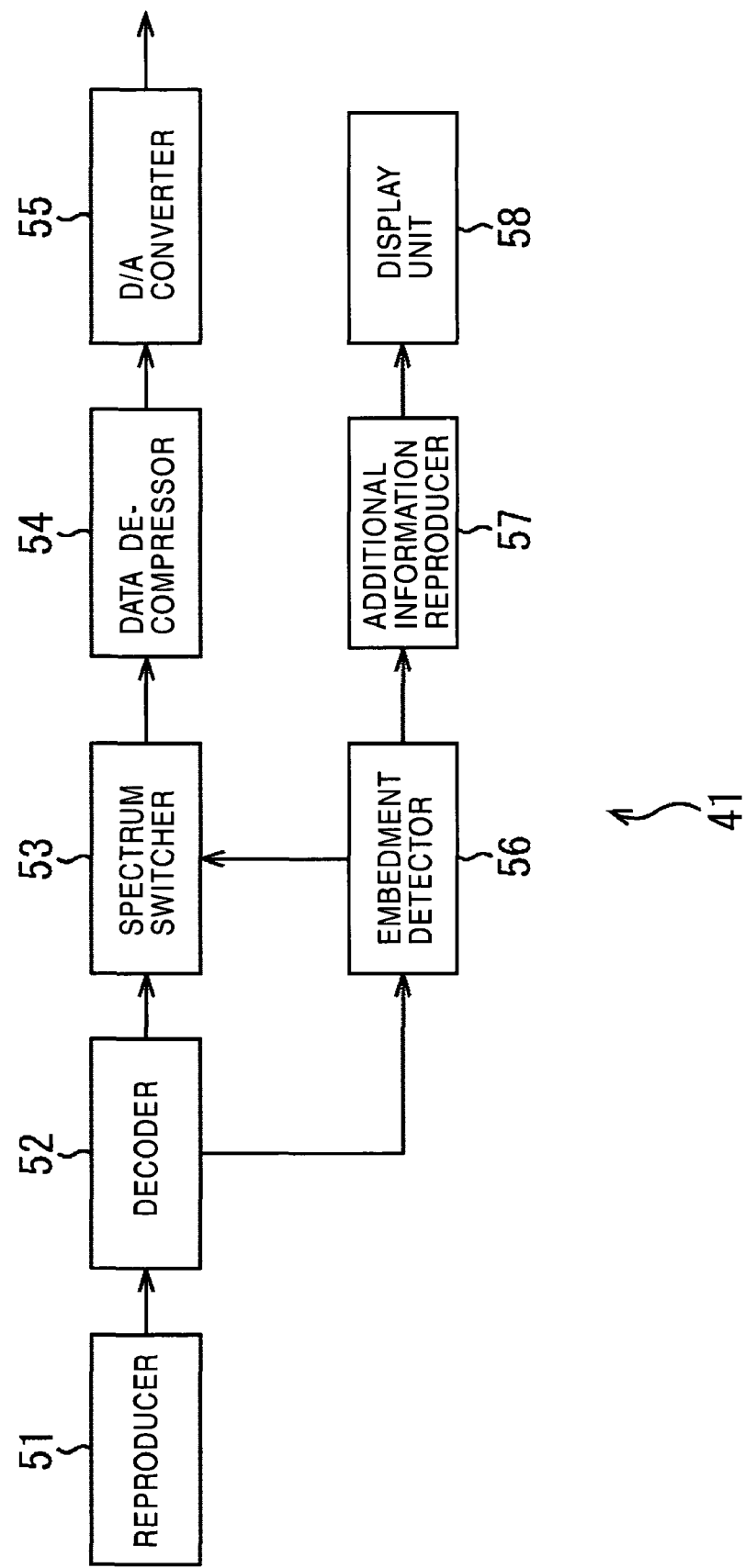
FIG. 10 is a block diagram showing a configuration example of an information processor to which the present invention has been applied.

FIG. 10 shows a configuration of an information processor for decoding the audio signals encoded as described above. In an information processor 41, a reproducer 51 reproduces the signals recorded in a disc and supplies the reproduced signals to a decoder 52. The decoder 52 decodes the encoded audio signals. The decoded signals are supplied to a spectrum switcher 53 and an embedment detector 56.

The embedment detector 56 detects the presence of embedded data, generates a control signal for controlling the switching of spectra on the basis of its detection result, and outputs the generated control signal to the spectrum switcher 53.

The spectrum switcher 53 switches the spectra on the basis of the control signal from the embedment detector 56.

The embedment detector 56 also detects embedded bits and supplies them to an added information reproducer 57.

The added information reproducer 57 accumulates input bits and generates text data based on the accumulated bits and outputs the generated text data to a display unit 58 to display it.

A data decompressor 54 decompresses spectrum signals received from the spectrum switcher 53 by, for example, carrying out inverse Fourier transformation or by converting frequency signals into time-axis signals, and outputs the decompressed signals to a D/A converter 55.

The D/A converter 55 converts the received signals from digital signals into analog signals and outputs the analog signals to a speaker or the like (not shown).

Figure 11:
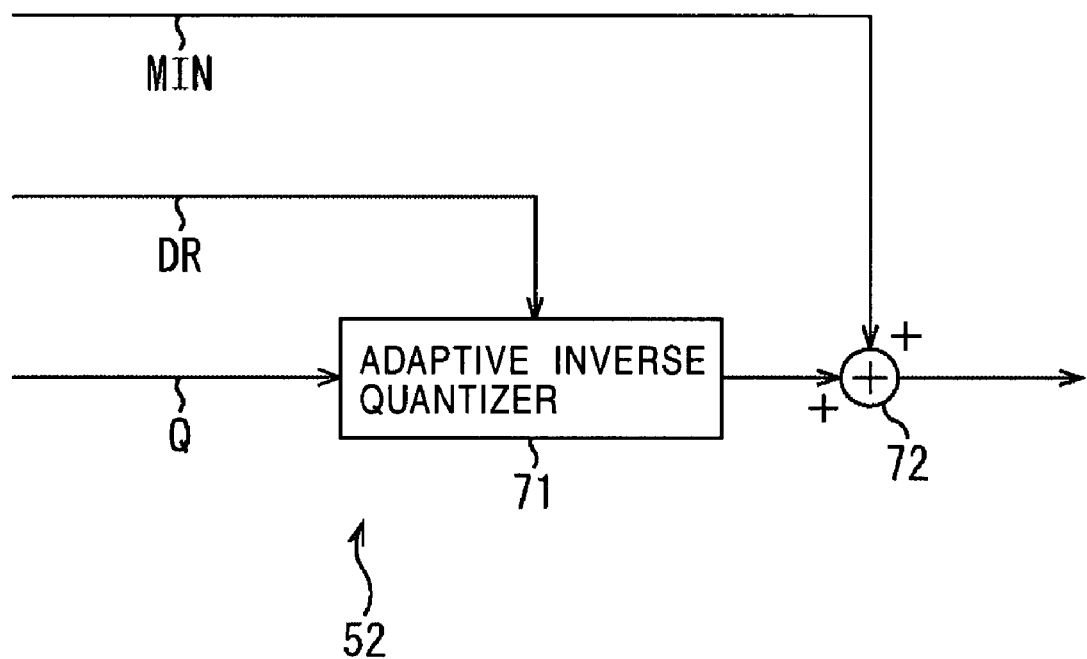
FIG. 11 is a block diagram showing a configuration example of a decoder shown in FIG. 10.

The decoder 52 is constructed, for example, as shown in FIG. 11.

An adaptive inverse quantizer 71 divides the received dynamic range DR by 2 n to calculate a quantization step width, multiplies the quantization step width by a received quantization code Q, and outputs the result to an adder 72. The adder 72 adds a received minimum value MIN to the multiplication result supplied from the adaptive inverse quantizer 71 so as to decode the data, and outputs the decoded data.

Figure 12:
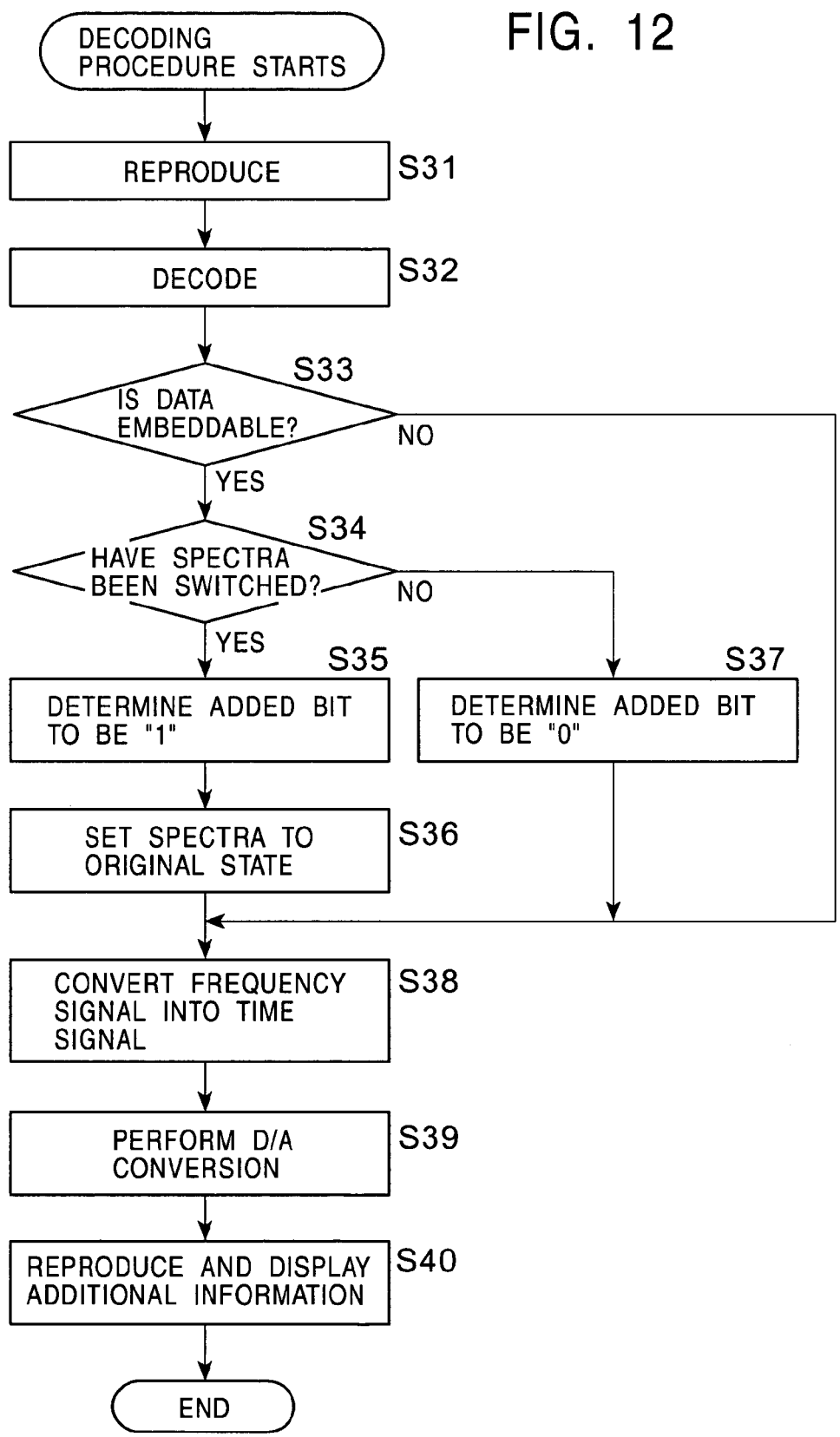
FIG. 12 is a flowchart illustrating the decoding processing carried out by the information processor shown in FIG. 10.

Referring now to the flowchart shown in FIG. 12, the decoding carried out by the information processor shown in FIG. 10 will be explained.

In step S31, the reproducer 51 reproduces the signals recorded in a disc.

In step S32, the decoder 52 decodes the input audio signal. More specifically, the adaptive inverse quantizer 71 calculates a quantization step width by dividing the dynamic range DR by 2 n supplied from the reproducer 51. The adaptive inverse quantizer 71 multiplies the quantization code Q received from the reproducer 51 by the calculated quantization step width, and outputs the multiplication result to the adder 72. The adder 72 adds the multiplication result received from the adaptive inverse quantizer 71 to the minimum value MIN supplied from the reproducer 51 so as to decode the data.

In step S33, the embedment detector 56 determines whether data can be embedded in the audio signal. Whether data can be embedded is determined in the same manner as that in step S14 shown in FIG. 4. More specifically, it is determined that the data can be embedded in the audio signal if the following two conditions are met: Sa>C(fa) and Sb>C(fb)Sa<C(fb) or Sb<C(fa) where the levels of two predetermined frequencies fa and fb are denoted as Sa and Sb and the function imparting a minimum audible limit value for each frequency is denoted as C(f).

To be more specific, as shown in FIGS. 5 and 6, if only one of the two spectrum levels is smaller than the minimum audible limit value, i.e., if the state is as shown in FIG. 6 (the spectra having been switched), or if only one level is smaller than the minimum audible limit value, i.e., if the state is as shown in FIG. 5 (the spectra having been switched), when the spectrum positions have been switched, then it is determined that data can be embedded. In any cases other than the above, it will be determined that data cannot be embedded.

If it is determined in step S33 that the audio signal can be embedded, then the embedment detector 56 determines in step S34 whether the spectra have been switched. If data can be embedded, then data is always embedded in the frequency spectrum.

Referring to FIG. 6, the level Sa corresponding to the frequency fb is smaller than the minimum audible limit value. The spectra of the levels lower than the minimum audible limit value are basically removed, so that they are not transmitted. Therefore, when the spectrum of the level lower than the minimum audible limit value is found, it may be determined that the audio signal has undergone the switching of the levels Sa and Sb. This can be proved by the fact that, when the positions of the spectrum levels Sa and Sb at the frequencies fa and fb have been switched, the spectrum levels will both exceed the minimum audible limit value.

Referring back to FIG. 5, if the spectrum levels Sa and Sb of the two frequencies fa and fb of the received audio signal are both higher than the minimum audible limit values corresponding to the frequencies, then it may be determined that the levels Sa and Sb of the two frequencies fa and fb have not been switched.

If it is determined in step S34 that the spectra have not been switched, then the procedure proceeds to step S35 wherein the embedment detector 56 determines that the embedded or added bit is 1 and outputs the determination result to the added information reproducer 57. The embedment detector 56 also produces a control signal for switching the spectra and outputs the control signal to the spectrum switcher 53. The spectrum switcher 53 switches the positions of the spectrum signals supplied from the decoder 52 according to the control signal. More specifically, the spectrum switcher 53 sets the spectrum level Sa of the frequency fa to the spectrum level of the frequency fb, while it sets the spectrum level Sb of the frequency fb to the spectrum level of the frequency fa.

If it is determined in step S34 that the spectra have not been switched, then the embedment detector 56 determines in step S37 that the embedded or added bit is 0, and outputs the determination result to the added information reproducer 57. In this case, the embedment detector 56 does not generate a control signal for switching spectra. In other word, the embedment detector 56 generates a control signal for not switching spectra.

If it is determined in step S33 that data cannot be embedded, following the processing carried out in step S36 or step S37, the data decompressor 54 carries out inverse Fourier transformation on the audio signal, which has been converted by the compressor 13 from the time-axis signal to the frequency-axis signal, so as to converted it from the frequency-axis signal back into the time-axis signal when encoding the audio signal in step S38.

In step S39, the D/A converter 55 converts the audio signal from a digital signal into an analog signal and outputs the analog signal to a speaker (not shown).

In step S40, the added information reproducer 57 accumulates the bits supplied from the embedment detector 56, converts 8 bits into one-character text data and outputs the text data to the display unit 58 to display it. Thus, the information added to the audio signal is displayed. If the information is lyrics corresponding to the music of audio data, then a user can see the lyrics while reproducing the music.

If the information to be added is, for example, copyright information prohibiting embedded audio signals from being copied, then it is possible to prohibit the audio signals reproduced from a disc from being recorded in another recording medium on the basis of the copyright information.

A series of steps of the processing described above can be implemented by hardware or software. To implement the processing by software, the software is to be installed in a general computer or the like.

FIG. 13 shows a configuration example of a computer according to an embodiment to which a program for executing the aforesaid series of processing steps has been installed.

A computer 91 includes a central processing unit (CPU) 101. An input/output interface 106 is connected to the CPU 101 via a bus 105. When the CPU 101 receives, via the input/output interface 106, instructions entered by a user who operates an input unit 108 constructed of a keyboard, a mouse, etc., the CPU 101 runs the program stored in a read-only memory (ROM) 102.

Alternatively, the CPU 101 loads a program stored in a hard disk 104, a program transferred from a satellite or network, received by a communication unit 109 and installed in the hard disk 104, or a program read from a removable recording medium 111 mounted on a drive 110 and installed in the hard disk 104, onto a random access memory (RAM) 103 to execute the program.

Thus, the CPU 101 performs the processing according to the aforesaid flowcharts or the processing carried out in the configurations illustrated by the block diagrams described above. The CPU 101 then outputs processing results through an output unit 107 constructed of a speaker or the like, transmits them through a communication unit 109, or records them in the hard disk 104, as necessary, through the intermediary of, for example, the input/output interface 106.

The program can be recorded beforehand in the hard disk 104 or the ROM 102 serving as a recording medium incorporated in the computer.

Alternatively, the program can be temporarily or permanently stored or recorded in the removable recording medium 111, such as a Floppy (registered trade name) disk, a compact disc read-only memory (CD-ROM), a magneto-optical (MO) disc, a digital versatile disc (DVD), a magnetic disc, or a semiconductor memory. The removable recording medium 111 can be provided as "package software."

In addition to installing the program from the aforesaid removable recording medium 111 into a computer, the program can be also wirelessly transferred from a download site into a computer through the intermediary of an artificial satellite for digital satellite broadcast or wiredly transferred to a computer through a network, such as a local area network (LAN) or the Internet. This allows the computer to receive the program transferred as describe above through the communication unit 109 and to install the program in the built-in hard disk 104.

In this specification, the processing steps constituting the program for causing the computer to carry out various types of processing do not necessarily have to follow the sequence indicated by the flowcharts in time series. The program also includes processing carried out in parallel or individually (e.g., parallel processing or object-oriented processing).

Furthermore, the program may be run on a single computer or a plurality of computers in a distributed processing mode. Further alternatively, the program may be transferred to a remote computer wherein the program is executed.

What is claimed is:

1. An information encoding apparatus for encoding information and recording the encoded information onto a computer-readable medium, the apparatus comprising:

converting means for converting an input signal into a spectrum signal;

removing means for removing the spectra of frequencies having levels below a minimum audible level curve among spectra converted by the converting means;

first determining means for determining whether predetermined first frequency spectrum level and second frequency spectrum level are both above the minimum audible level curve;

second determining means for determining whether one of the first frequency spectrum level and the second frequency spectrum level is below the minimum level if the first and second frequency spectrum levels are switched after the first determining means determines that the first frequency spectrum level and the second frequency spectrum level are both above the minimum audible level curve;

adding means for adding information by controlling to switch or not to switch the spectra on the basis of the information to be added if the second determining means determines that one of the first frequency spectrum level and the second frequency spectrum level is below the minimum audible level curve when the first and second frequency spectrum levels have been switched; and encoding means for encoding a spectrum to which information has been added by the adding means.

2. The information encoding apparatus according to claim 1, wherein the encoding means comprises:

means for determining a minimum value and a maximum value of the input signal for each predetermined unit;

dynamic range calculating means for calculating a dynamic range for each predetermined unit from the maximum value and the minimum value for each predetermined unit;

difference computing means for determining a difference between the input signal and the minimum value and outputting the determined difference; and a quantizing means for quantizing the determined difference on the basis of the calculated dynamic range and outputting a quantized result.

3. An information encoding method for encoding information and recording the encoded information onto a computer-readable medium, comprising:

a converting step for converting an input signal into a spectrum signal;

a removing step for removing the spectra of frequencies having levels below a minimum audible level curve among spectra converted by processing in the converting step;

a first determining step for determining whether predetermined first frequency spectrum level and second frequency spectrum level are both above the minimum audible level curve;

a second determining step for determining whether one of the first frequency spectrum level and the second frequency spectrum level is below the minimum level if the first and second frequency spectrum levels have been switched after the processing of the first determining step determines that the first frequency spectrum level and the second frequency spectrum level are both above the minimum audible level curve;

an adding step for adding information by controlling to switch or not to switch the spectra on the basis of the information to be added if the processing of the second determining step determines that one of the first frequency spectrum level and the second frequency spectrum level is below the minimum audible level curve when the first and second frequency spectrum levels have been switched; and an encoding step for encoding a spectrum to which information has been added by the processing of the adding step.

4. A computer-readable recording medium storing a program that when executed by a computer for controlling an information encoding apparatus performs a method comprising:

a converting step for converting an input signal into a spectrum signal;

a removing step for removing the spectra of frequencies having levels below a minimum audible level curve among spectra converted by the processing in the converting step;

a first determining step for determining whether predetermined first frequency spectrum level and second frequency spectrum level are both above the minimum audible level curve;

a second determining step for determining whether one of the first frequency spectrum level and the second frequency spectrum level is below the minimum level if the first and second frequency spectrum levels have been switched after the processing of the first determining step determines that the first frequency spectrum level and the second frequency spectrum level are both above the minimum audible level curve;

an adding step for adding information by controlling to switch or not to switch the spectra on the basis of the information to be added if the processing of the second determining step determines that one of the first frequency spectrum level and the second frequency spectrum level is below the minimum audible level curve when the first and second frequency spectrum levels have been switched;

an encoding step for encoding a spectrum to which information has been added by the processing of the adding step; and an output step for outputting the encoded spectrum.

5. An information decoding apparatus comprising:

decoding means for decoding an input signal;

first determining means for determining whether only one of a first frequency spectrum level and a second frequency spectrum level of a signal decoded by the decoding means is below a minimum audible level curve;

second determining means for determining whether the first frequency spectrum level and the second frequency spectrum level are both above the minimum level when the first and second frequency spectrum levels are switched;

reproducing means for reproducing added information on the basis of determination results of the first determining means and the second determining means; and outputting the information.

6. The information decoding apparatus according to claim 5, wherein the input signal is a signal obtained by quantizing a minimum value of a signal for every predetermined unit, a dynamic range of the signal for the every predetermined unit and a difference between the signal and the minimum value for the every predetermined unit on the basis of the dynamic range, and the decoding means comprises:

inverse quantizing means for calculating a quantizing step width from the dynamic range, inversely quantizing the quantized signal and outputting the inversely quantized signal; and adding means for adding the minimum value to the inversely quantized signal.

7. An information decoding method comprising:

a decoding step for decoding an input signal;

a first determining step for determining whether only one of a first frequency spectrum level and a second frequency spectrum level of a signal decoded by the processing of the decoding step is below a minimum audible level curve;

a second determining step for determining whether the first frequency spectrum level and the second frequency spectrum level are both above the minimum level when the first and second frequency spectrum levels are switched;

a reproducing step for reproducing added information on the basis of determination results obtained by the processing of the first determining step and the second determining step; and an outputting step for outputting the information.

8. A computer-readable recording medium storing a program that when executed by a computer controls an information decoding apparatus to perform a method comprising:

a decoding step for decoding an input signal;

a first determining step for determining whether only one of a first frequency spectrum level and a second frequency spectrum level of a signal decoded by processing of the decoding step is below a minimum audible level curve;

a second determining step for determining whether the first frequency spectrum level and the second frequency spectrum level are both above the minimum level when the first and second frequency spectrum levels are switched;

a reproducing step for reproducing added information on the basis of determination results obtained by the processing of the first determining step and the second determining step; and an output step that outputs the added information.

* * * * *